United States Patent
Verbrugh et al.

(10) Patent No.: US 7,318,663 B2
(45) Date of Patent: Jan. 15, 2008

(54) VEHICLE WITH LIGHTING SYSTEM FOR TAIL LIGHTS AND LICENSE PLATE COMPRISING LIGHT EMITTING DIODES AND OPTICAL WAVEGUIDE

(75) Inventors: Stefan Marcus Verbrugh, Eindhoven (NL); Nicola Bettina Pfeffer, Eindhoven (NL); Johannes Adrianus Frederikus Peek, Beek (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/562,894

(22) PCT Filed: Jun. 29, 2004

(86) PCT No.: PCT/IB2004/051042

§ 371 (c)(1),
(2), (4) Date: Dec. 29, 2005

(87) PCT Pub. No.: WO2005/002918

PCT Pub. Date: Jan. 13, 2005

(65) Prior Publication Data

US 2006/0250808 A1    Nov. 9, 2006

(30) Foreign Application Priority Data

Jul. 2, 2003  (EP) .................. 03300047

(51) Int. Cl.
*F21V 8/00* (2006.01)
*B60Q 1/56* (2006.01)
*B60Q 1/44* (2006.01)

(52) U.S. Cl. ........................ 362/511; 362/497

(58) Field of Classification Search .......... 362/497, 362/511, 498, 499
See application file for complete search history.

(56) References Cited

U.S. PATENT DOCUMENTS

| | | | | |
|---|---|---|---|---|
| 5,150,960 A | * | 9/1992 | Redick | 362/497 |
| 5,422,792 A | | 6/1995 | Neumann | |
| 5,434,754 A | | 7/1995 | Li et al. | |
| 5,791,757 A | | 8/1998 | O'Neil et al. | |
| 6,027,235 A | | 2/2000 | Chen | |
| 6,152,588 A | * | 11/2000 | Scifres | 362/496 |
| 6,471,379 B2 | * | 10/2002 | Bucher et al. | 362/497 |
| 6,491,420 B1 | * | 12/2002 | Scifres | 362/553 |
| 6,874,922 B2 | * | 4/2005 | Matsuura et al. | 362/497 |
| 2002/0159741 A1 | * | 10/2002 | Graves et al. | 385/133 |

FOREIGN PATENT DOCUMENTS

| | | |
|---|---|---|
| DE | 198 38 474 A1 | 12/1999 |
| DE | 19961875 A1 | 7/2001 |
| DE | 19961875 C2 | 7/2001 |
| FR | 2824174 A1 | 10/2002 |
| GB | 2 333 830 A | 8/1999 |
| WO | WO99/06760 | 2/1999 |

* cited by examiner

*Primary Examiner*—Alan Cariaso
*Assistant Examiner*—Leah S. Lovell

(57) ABSTRACT

A vehicle includes at least one tail light, a rear license plate to be illuminated, and a light source for emitting a light beam to an optical waveguide disposed adjacent the light source. The optical waveguide has an input surface facing towards the light source for inputting at least part of the light beam from the light source, as well as with at least one output surface for outputting a light beam that is being passed through the optical waveguide to the license plate and/or the at least one tail light. The light source may be a light emitting diode.

20 Claims, 2 Drawing Sheets

VEHICLE WITH LIGHTING SYSTEM FOR TAIL LIGHTS AND LICENSE PLATE COMPRISING LIGHT EMITTING DIODES AND OPTICAL WAVEGUIDE

The invention relates to a vehicle fitted with at least one tail light and a rear license plate to be illuminated.

Such a vehicle fitted with two tail lights and a rear license plate to be illuminated is generally known. As a rule, the tail lights of the known vehicle are each fitted with an incandescent lamp of about 5 to 10 W, whilst the rear license plate is often illuminated by at least two incandescent lamps, likewise of 5 to 10 W. As is usual, the tail lights and the rear license plate lights are turned on and off simultaneously.

One drawback of the known vehicle is the fact that at least four low-output incandescent lamps are needed, as indicated above. Because of their low output, such incandescent lamps are often not very effective, whilst the installation thereof is laborious and has a cost-increasing effect.

The object of the invention is to obviate the drawbacks of the prior art, and in particular to provide a vehicle in which the effectiveness of the lamps used for lighting the rear of the vehicle is increased.

In order to accomplish that objective, a vehicle of the kind referred to in the introduction is characterized in that a light source for emitting a light beam to an optical waveguide disposed adjacent the light source is provided, said optical waveguide being provided with an input surface facing towards the light source for inputting at least part of the light beam from the light source, as well as with at least one output surface for outputting a light beam that is being passed through the optical waveguide to the license plate and/or the at least one tail light. Preferably, the light source(s) of the tail light(s) will illuminate—via the optical waveguide—the license plate, whereas in the alternative the light source(s) of the license plate will illuminate—via the optical waveguide—the tail light(s) of the vehicle. It is also possible that the light source(s) are located elsewhere, i.e. not being the light source(s) of the tail light(s) or the license plate. The optical waveguide in particular comprises at least two output surfaces, of which one output surface outputs part of the light beam that is being passed through said optical waveguide to the license plate and of which the other output surface outputs part of the light beam that is being passed through said optical waveguide to the tail light. As a result of this arrangement it is no longer necessary to provide separate lamps for each function, viz. tail light(s) and rear license plate lights, as was previously the case, but one or more lamps function both as the tail light(s) and as the license plate lights. Thus, a lamp may emit a light beam, part of which is directly used for the tail light, whilst another part is passed to the license plate via the optical waveguide for the purpose of illuminating said license plate. According to another possibility, the light beam emitted by the lamp is passed both to the tail light and to the license plate via the optical waveguide. In all the above cases, the tail lights and the license plate lights are turned on and off simultaneously.

International patent publication no. WO 99/06760 (SDL, Inc.) discloses a vehicle with a plurality of individually addressable semiconductor laser light sources each producing a beam of light, wherein said light sources are optically coupled to fiber optic waveguides. The laser light sources are grouped together at a single location within the vehicle for easy access and conveniently located within the vehicle. Said fiber optic waveguides distally transmit the light beams to the brake lights, tail lights, instrumentation lights and indicator lights of the vehicle. A disadvantage of this known vehicle is that each laser light must be individually switched on or off, with all electrical complications involved, whereas quite a number of fiber optic waveguides are necessary within the vehicle. Furthermore, a central location of the group of laser lights is found to be cumbersome and even undesirable in practice, particularly when said location is damaged in the event of a collision.

In one preferred embodiment of the vehicle according to the invention, the optical waveguide is disposed in part in front of the license plate. In particular, the part of the optical waveguide that is disposed in front of the license plate is transparent.

In another preferred embodiment of a vehicle according to the invention, the part of the optical waveguide that is disposed in front of the license plate comprises means for directing the light beam that is being output from the output surface towards the license plate. Such optical directing means in particular comprise a mirror or a lens.

In another preferred embodiment of a vehicle according to the invention, the optical waveguide is arranged in part near a transversal or longitudinal edge of the license plate. Also in this case, the part of the optical waveguide that is disposed near the edge of the license plate particularly comprises means (in particular mirrors or lenses) for directing the light beam that is being output from the output surfaces towards the license plate.

In another preferred embodiment of a vehicle according to the invention, the vehicle comprises at least two tail lights. Particularly, the two tail lights each comprise a lamp which lamps, for example, also illuminate the rear license plate via the optical waveguide. In another preferred variant, a lamp is used which provides the light for the tail lights as well as for the license plate via the optical waveguide.

In another preferred embodiment of a vehicle according to the invention, the light source comprises a LED (light emitting diode). It is possible then to use red LEDs and white LEDs close together, the red LEDs being used for the tail lights and the white LEDs being used for illuminating the license plate, all via the optical waveguide.

The invention also relates to an optical waveguide suitable for use in a vehicle according to the invention.

The invention will be explained in more detail hereinafter with reference to FIGS. illustrated in a drawing, in which.

Figure 1:
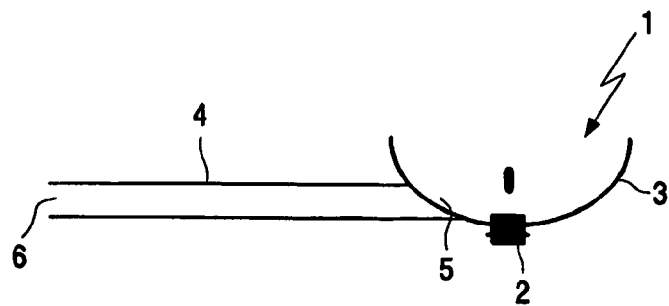
FIGS. 1 and 2 are schematic side elevations of a first and a second embodiment of a lighting system for use in the vehicle according to the invention.

FIG. 1 shows a lighting system which comprises a tail light 1 provided with a light source 2 in the form of a LED (light emitting diode), for example, and a reflector 3 for reflecting a light beam emitted by the LED rearwards in the direction of traffic coming up from behind. An optical waveguide 4 is disposed adjacent the LED. The optical waveguide 4 has an input surface 5 facing towards the LED for inputting part of the light beam from the LED, as well as an output surface 6 for outputting the part of the light beam that is being passed through the optical waveguide to a license plate (not shown).

Figure 2:
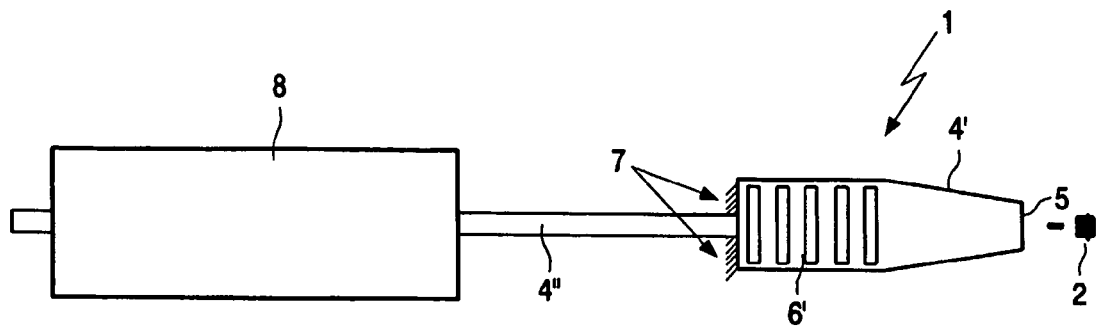
Figure 3:
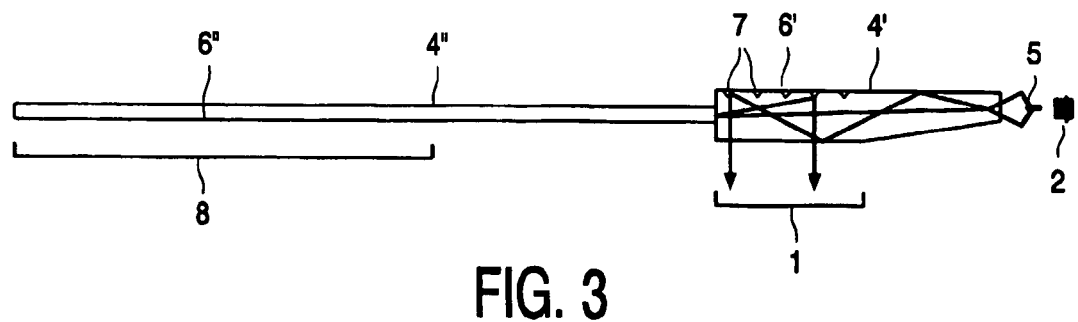
FIG. 3 is a plan view of the lighting system of FIG. 2.

FIG. 2 shows a lighting system similar to the system that is shown in FIG. 1, with corresponding parts being indicated by the same numerals, with this understanding that the optical waveguide 4 consists of two portions 4' and 4". The portion 4' has an input surface 5 for inputting the light beam from the LED and an output surface 6' for outputting (by means of mirrors 7) part of the light beam that is being passed through the optical waveguide portion 4' to the tail light 1. The optical waveguide portion 4", which is mounted in line with the optical waveguide portion 4', likewise has an output surface 6", as shown in FIG. 3, for guiding and subsequently outputting part of the light beam that is being passed through the optical waveguide portion 4' to the license plate 8. The optical waveguide portion 4" is in part mounted in front of the license plate 8.

Figure 4:
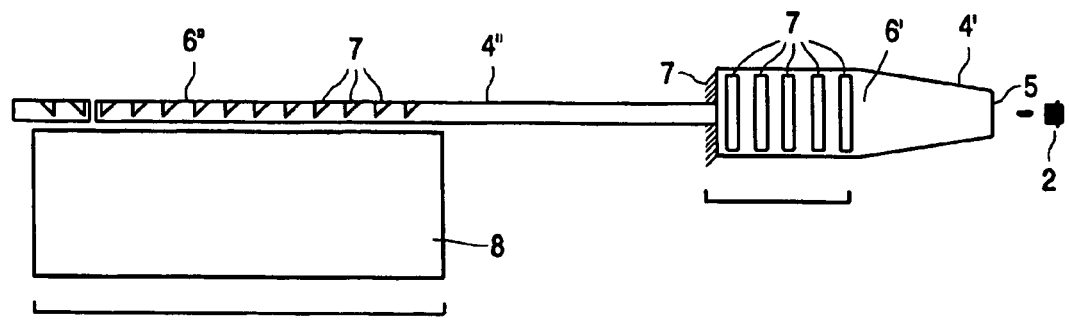
FIGS. 4 and 5 are schematic side elevations of a second and a third embodiment of a lighting system for use in a vehicle according to be invention.

FIG. 4 corresponds to FIG. 3, with corresponding parts being indicated by the same numerals, with this understanding that the portion 4" of the optical waveguide 4 is in part disposed near a longitudinal edge of the license plate 8. Again, mirrors 7 are used for directing the light beam that is being output from the output surface 6" towards the license plate 8.

Figure 5:
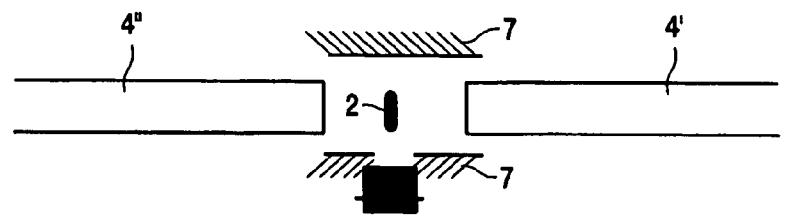

FIG. 5 shows a lighting system in which a light source 2 is positioned centrally between the portions 4', 4" of the optical waveguide 4, in which the light source 2 is further bounded by mirrors 7 for the purpose of passing a light beam emitted by the light source 2 through the optical waveguide portions 4', 4" in the direction of the tail light 1 on the one hand and of the license plate 8 on the other hand, and that with minimal losses.

Figure 6:
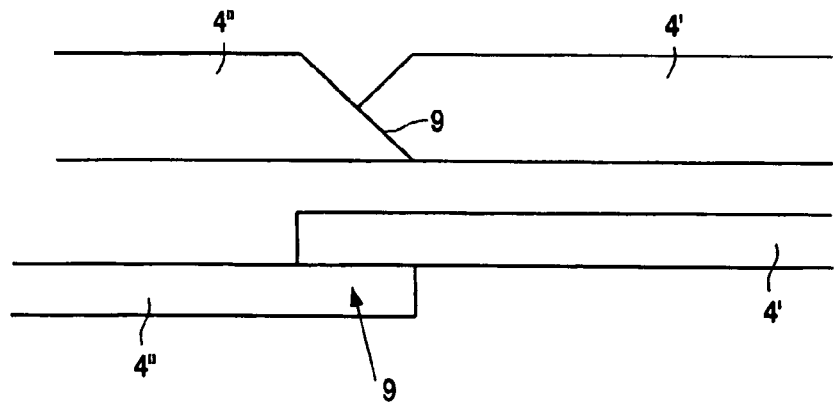
FIG. 6 is a schematic side elevation and bottom view of coupled optical waveguide components.
Figure 7:
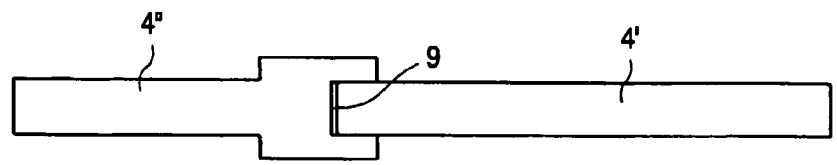
FIG. 7 is another bottom view of coupled optical waveguide components.

FIG. 6 shows two coupled portions 4', 4" of the optical waveguide 4 in side elevation and in bottom view, respectively. The coupled portions 4', 4" comprise an overlapping portion 9 for inputting a light beam emitted by the light source 2 via the overlapping portion in an efficient manner. FIG. 7 shows a bottom view of another design of partially overlapping portions 4', 4" of the optical waveguide 4.

It is noted that the invention is not limited to the illustrated embodiments, but that it also extends to other variants that fall within the scope of the appended claims.

The invention claimed is:

1. A vehicle fitted with at least one tail light and a rear license plate to be illuminated, comprising:
    an optical waveguide;
    a light source for emitting a light beam to the optical waveguide which is disposed adjacent the light source;
    said optical waveguide having an input surface facing towards the light source for inputting at least part of the light beam from the light source, and at least one output surface for outputting a light beam portion that is being passed through the optical waveguide to the license plate and the at least one tail light; and
    at least one of a mirror and a lens configured to direct the light beam portion that is being passed through the optical waveguide to the license plate and the at least one tail light.

2. The vehicle according to claim 1, wherein a part of the optical waveguide is disposed in front of the license plate.

3. The vehicle according to claim 2, wherein the part of the optical waveguide that is disposed in front of the license plate is transparent.

4. The vehicle according to claim 2, wherein the part of the optical waveguide that is disposed in front of the license plate comprises the at least one of the mirror and the lens for directing the light beam that is being output from the output surface towards the license plate.

5. The vehicle according to claim 1, wherein part of the optical waveguide is arranged near an edge of the license plate.

6. The vehicle according to claim 5, wherein the part of the optical waveguide that is disposed near the edge of the license plate comprises the at least one of the mirror and the lens for directing the light beam that is being output from the output surfaces towards the license plate.

7. The vehicle according to claim 1, wherein said vehicle comprises at least two tail lights.

8. The vehicle according to claim 1, wherein said light source comprises a light emitting diode.

9. An optical waveguide suitable for use in the vehicle according to claim 1.

10. The vehicle of claim 1, wherein the optical waveguide comprises a first portion having one end that forms an opening for receiving a second portion of the optical waveguide.

11. The vehicle of claim 1, wherein the optical waveguide comprises a first portion having a first end configured to receive the light beam from the light source and provide the light beam to a second portion of the optical waveguide via a second end of the first portion, the second end forming an opening for receiving the second portion of the optical waveguide.

12. A vehicle fitted with at least one tail light and a rear license plate to be illuminated, comprising:
    an optical waveguide;
    a light source for emitting a light beam to the optical waveguide which is disposed adjacent the light source;
    said optical waveguide having an input surface facing towards the light source for inputting at least part of the light beam from the light source, and at least one output surface for outputting a light beam portion that is being passed through the optical waveguide to the license plate and/or the at least one tail light; and
    at least one of a mirror and a lens configured to direct the light beam portion that is being passed through the optical waveguide to the license plate and/or the at least one tail light,
    wherein the optical waveguide comprises at least a first output surface and a second output surface, wherein the first output surface outputs a first part of the light beam that is being passed through said optical waveguide to the license plate, and wherein the second output surface outputs a second part of the light beam that is being passed through said optical waveguide to the at least one tail light.

13. A vehicle fitted with at least one tail light and a rear license plate to be illuminated, comprising:
    an optical waveguide;
    a light source for emitting a light beam to the optical waveguide which is disposed adjacent the light source;
    said optical waveguide having an input surface facing towards the light source for inputting at least part of the light beam from the light source, and at least one output surface for outputting a light beam portion that is being passed through the optical waveguide to the license plate and/or the at least one tail light; and
    at least one of a mirror and a lens configured to direct the light beam portion that is being passed through the optical waveguide to the license plate and/or the at least one tail light,
    wherein the optical waveguide comprises a first portion which overlaps a second portion of the optical waveguide at an overlapping section, the optical waveguide being configured to illuminate at least two tail lights of the vehicle through the first portion and the second portion.

14. The vehicle of claim 13, wherein the first portion is configured to receive the light beam from the light source and provide the light beam to the second portion via the overlapping section.

15. A vehicle fitted with at least one tail light and a rear license plate to be illuminated, comprising:
- an optical waveguide;
- a light source for emitting a light beam to the optical waveguide which is disposed adjacent the light source;
- said optical waveguide having an input surface facing towards the light source for inputting at least part of the light beam from the light source, and at least one output surface for outputting a light beam portion that is being passed through the optical waveguide to the license plate and/or the at least one tail light; and
- at least one of a mirror and a lens configured to direct the light beam portion that is being passed through the optical waveguide to the license plate and/or the at least one tail light, wherein the at least one of the mirror and the lens forms the at least one tail light.

16. An optical waveguide included in a vehicle fitted with at least one tail light and a rear license plate to be illuminated, the optical waveguide comprising:
- an input surface facing a light source, the input surface being configured to receive part of a light beam from the light source; and
- at least one of a mirror and a lens configured for directing the part of the light beam that is being passed through the optical waveguide to a license plate and the at least one tail light of the vehicle through at least one output surface of the optical waveguide.

17. The optical waveguide of claim 16, wherein the optical waveguide comprises a first portion which overlaps a second portion at an overlapping section for coupling light from the first portion to the second portion via the overlapping section.

18. The optical waveguide of claim 16, wherein the optical waveguide comprises a first portion having one end that forms an opening for receiving a second portion of the optical waveguide.

19. The optical waveguide of claim 16, wherein the optical waveguide comprises a first portion having a first end configured to receive the light beam from the light source and provide the light beam to a second portion of the optical waveguide via a second end of the first portion, the second end forming an opening for receiving the second portion of the optical waveguide.

20. An optical waveguide included in a vehicle fitted with at least one tail light and a rear license plate to be illuminated, the optical waveguide comprising:
- an input surface facing a light source, the input surface being configured to receive part of a light beam from the light source; and
- at least one of a mirror and a lens configured for directing the part of the light beam that is being passed through the optical waveguide to a license plate and/or the at least one tail light of the vehicle through at least one output surface of the optical waveguide, wherein the at least one of a mirror and a lens forms the at least one tail light.

* * * * *